R. L. MORGAN.
MAGNETIC CHUCK AND METHOD OF MAKING THE SAME.
APPLICATION FILED MAY 15, 1918.
1,414,522.
Patented May 2, 1922.
3 SHEETS—SHEET 1.
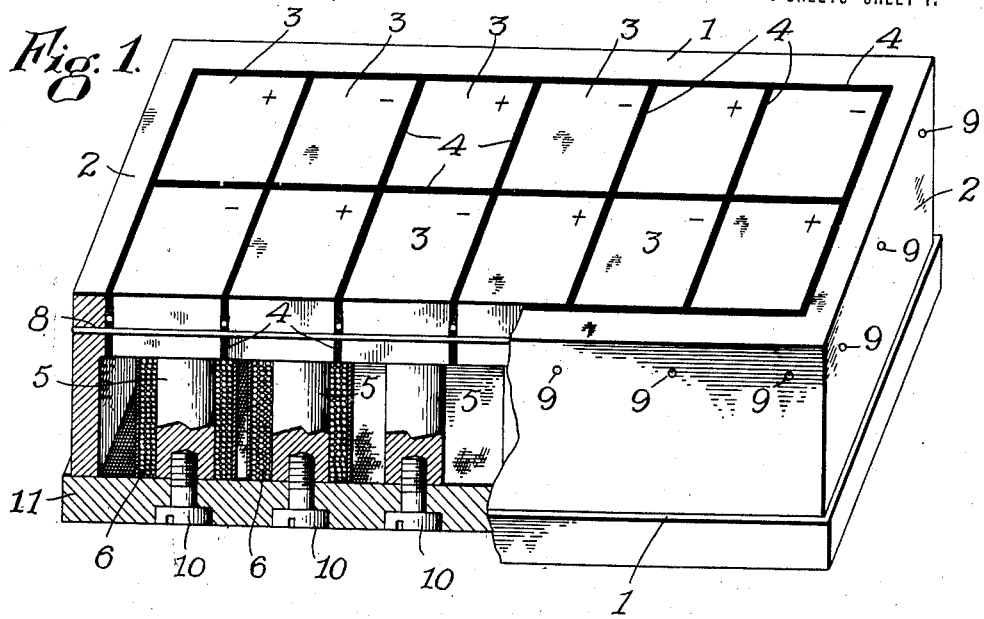
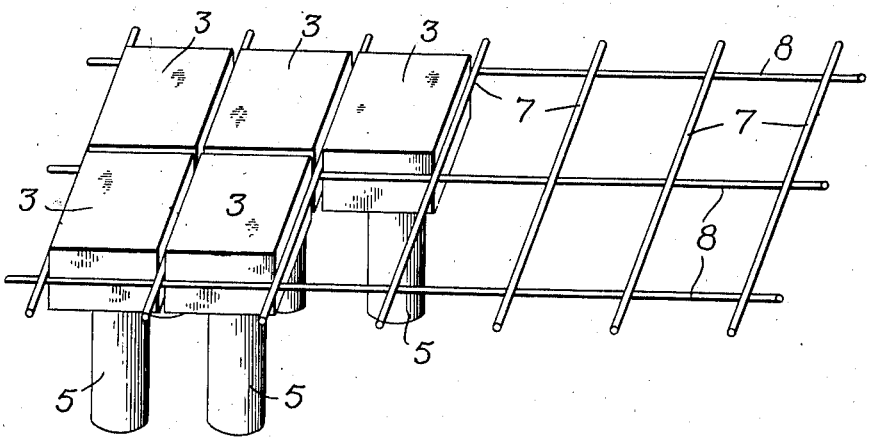
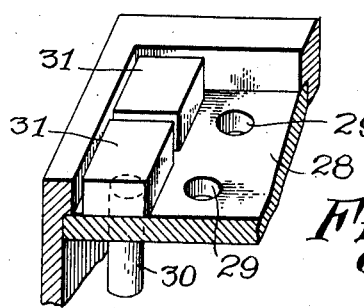
Inventor
Ralph L. Morgan
By Attorney
Geo. H. Kennedy R. L. MORGAN.
MAGNETIC CHUCK AND METHOD OF MAKING THE SAME.
APPLICATION FILED MAY 15, 1918.

1,414,522.

Patented May 2, 1922.

Inventor
Ralph L. Morgan
By Attorney
Geo. W. Kennedy Jr.

R. L. MORGAN.
MAGNETIC CHUCK AND METHOD OF MAKING THE SAME.
APPLICATION FILED MAY 15, 1918.

1,414,522.

Patented May 2, 1922.
3 SHEETS—SHEET 3.

Inventor
Ralph L. Morgan
By Attorney
Geo. H. Kennedy Jr.

UNITED STATES PATENT OFFICE.

RALPH L. MORGAN, OF WORCESTER, MASSACHUSETTS, ASSIGNOR, BY MESNE ASSIGNMENTS, TO GREENFIELD TAP AND DIE CORPORATION, OF GREENFIELD, MASSACHUSETTS, A CORPORATION OF MASSACHUSETTS.

MAGNETIC CHUCK AND METHOD OF MAKING THE SAME.

1,414,522.   Specification of Letters Patent.   Patented May 2, 1922.

Application filed May 15, 1918. Serial No. 234,738.

*To all whom it may concern:*

Be it known that I, RALPH L. MORGAN, a citizen of the United States, residing at Worcester, in the county of Worcester and Commonwealth of Massachusetts, have invented a new and useful Improvement in Magnetic Chucks and methods of making the same, of which the following, together with the accompanying drawings, is a specification.

The present invention relates to magnetic chucks for holding material, such as iron or steel, while various operations, such as boring, machining, grinding and the like, are being performed thereon.

An object of the invention is to provide a device of this class of extremely simple construction, and yet at the same time capable of developing a powerful magnetic attraction for the material in any position in which the latter may be placed on the face of the chuck. The invention further contemplates a new and improved method of assembling and securing the several pole pieces and cores which enter into the construction of a magnetic chuck, to the end that the cost of construction of a device of this class may be materially reduced, and the accuracy and speed of assemblage greatly increased. Other and further objects will be apparent as the description proceeds, reference being had in this connection to the accompanying drawings, wherein—

Fig. 1 is a perspective view, partly in section, of a magnetic chuck constructed in accordance with my invention.

Fig. 2 is a perspective view illustrating the spacing elements which enter into the construction of the chuck shown in Fig. 1.

Fig. 7 is a fragmentary perspective view illustrating another way of assembling the parts of a chuck shown in Fig. 1.

Like reference characters refer to like parts in the different figures.

Figure 3:
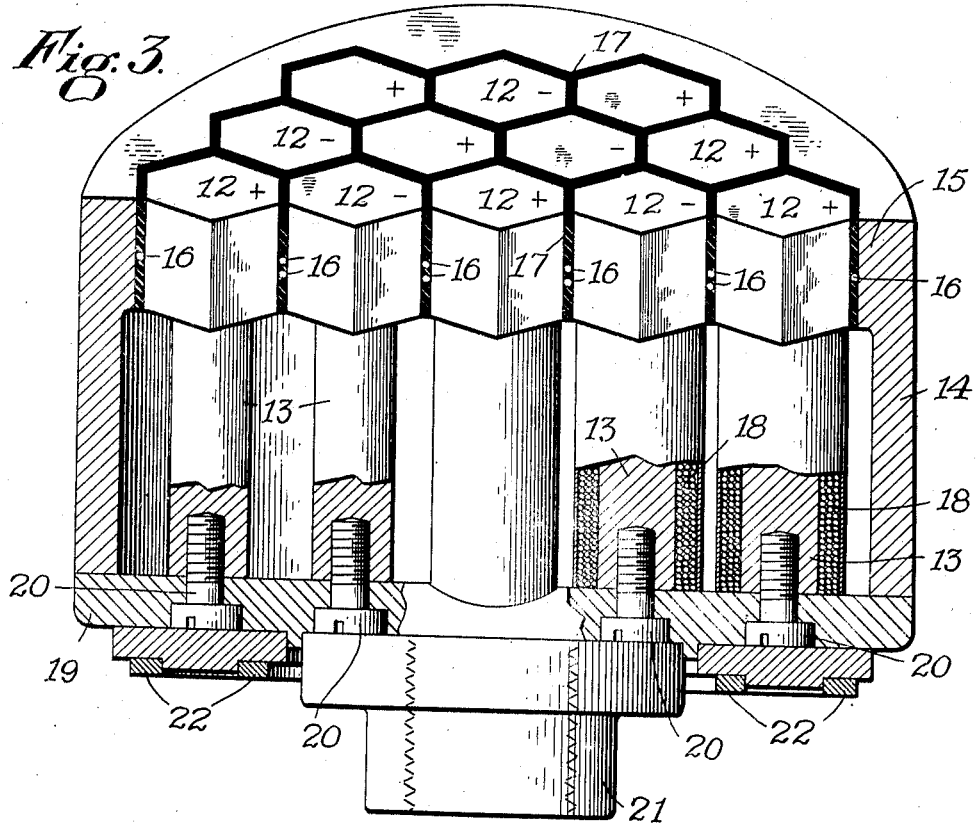
Fig. 3 is a perspective view, partly in section, of a modified form of chuck embodying my invention.

My invention is disclosed in Figs. 1 and 2 in connection with a magnetic chuck of rectangular form, the body of which may be constituted by an integral rectangular framework having side walls 1, 1 and end walls 2, 2. These side and end walls inclose a rectangular space at the top of the chuck adapted to contain a plurality of rows of pole pieces 3, 3, which, together with the strips of insulating or non-magnetic material 4, 4, completely fill this rectangular space, and constitute by themselves the entire work holding face of the chuck.

In such a work holding face, each pole piece 3, 3 is adapted to receive a different polarity from the pole piece adjoining it on any side, as shown by the + and − indications on Fig. 1. For energizing each pole piece 3, 3 in the manner above described, said pole pieces are provided with integral shanks or cores 5, 5, the latter adapted to receive suitable coils 6, 6, which are oppositely wound in the case of adjacent pole pieces.

It is an object of the invention to simplify the construction of devices of this class, and to this end all of the pole pieces 3, 3 and their integral cores 5, 5 may be readily produced in large quantities from ordinary rolled stock of standard cross section. In the present instance rolled stock of square cross section may be employed, to produce square pole pieces as shown in Fig. 1, and by automatic machinery, well known in the art, the shanks or cores 5, 5 of such pole pieces may readily be turned down to size in the same machine which cuts off the stock of square cross section into the desired lengths; any machine adapted to the manufacture of square headed bolts will suffice for this purpose.

The method of assembling the pole pieces in the chuck body, and of completing the manufacture of the chuck is as follows:—

In the upper portion of the chuck a plurality of parallel transverse spaced wires 7, 7 are disposed between the side walls 1, 1, the distance between said wires being the same as the corresponding dimension of each pole piece 3, so that said pole pieces fit snugly in the spaces between said wires. Similar wires 8, 8 crossing the wires 7, 7 are disposed lengthwise of the chuck, between the end walls 2, 2, thereby forming with the wires 7 a lattice work such as shown in Fig. 2, with each space thereof adapted to snugly receive one of the pole pieces 3. The wires 7, 7 and 8, 8 may be secured in suitable alined holes 9, 9 in the chuck body, or may be held there in any other desired way to form accurate spacers for the entire number of pole pieces. As herein shown, the longitudinal wires 8, 8 underlie the transverse wires 7, 7, but obviously this arrangement could be reversed, or if desired, alternate wires of each series could be disposed, one above and the other below the wires of the other series. When all the wires are in place, there is provided a space for each pole piece of the chuck face to be snugly inserted; it will be noted that said wires are provided also along the inner surfaces of the walls 1, 1 and 2, 2, to space the pole pieces from said walls.

The wires 7, 7 and 8, 8 are made of brass or other non-magnetic material, and in thickness they correspond substantially to the desired width of the magnetic insulation between adjacent pole pieces. As a consequence, said wires form a positive and unfailing means for securing the assemblage of all the pole pieces in the exact positions which they are to occupy in the finished chuck, and also a means for firmly holding said pole pieces in such positions during the operation of filling the spaces with the usual strips of non-magnetic material 4. It will be seen that the wires 7 and 8 by their engagement with the pole pieces on all sides thereof, prevent any displacement whatsoever of said pole pieces during the operation of pouring and casting the non-magnetic material 4, and further, that after said material is cast, said brass wires 7 and 8 become in effect an integral part thereof. The presence of these wires entirely eliminates the effects usually produced by any undue contraction or expansion of the material 4 while it is being poured or after it has cooled, and consequently all the pole pieces are left, after the pouring operation in an exactly centered and squared position, with the non-magnetic gaps between each one of them all of the same width.

After the pouring and cooling of the non-magnetic material, it is a simple matter to machine and grind the face of the chuck thus formed. The coils 6, 6 are then disposed in proper relation upon the projecting cores 5, 5, and the ends of said cores, being flush with the corresponding edges of the walls 1, 1 and 2, 2 are adapted to receive retaining screws 10, which are let in through a bottom plate 11 that closes the back or bottom side of the chuck.

In Fig. 3 is disclosed the adaptation of my invention to a circular chuck which is capable of rotation, and in this construction the pole pieces may advantageously be made of a different shape from the square pole pieces of Fig. 1, so as to more readily conform to the shape of the chuck. The pole pieces in this instance are shown as hexagonal elements 12, 12, having integral shanks or cores 13, and it is noteworthy that the same are just as susceptible of manufacture from standard rolled stock as the pole pieces 3, 3 of the construction shown in Fig. 1. In other words, any automatic machine for the manufacture of hexagonal bolts will suffice to turn out the pole pieces 12, 12 in large quantities for use with a chuck of this type.

Figure 4:
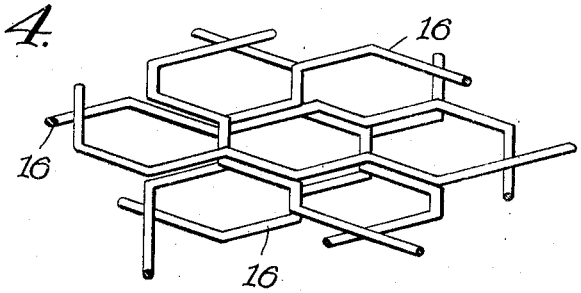
Fig. 4 is a perspective view illustrating the spacing elements which enter into the construction of the chuck shown in Fig. 3.

Such a chuck, as shown in Fig. 3, provides a circular shell 14, having an inturned flange 15 in its upper portion, the inner surface of which is shaped to correspond to the outer surface presented by a plurality of hexagonal heads arranged symmetrically about a central hexagonal head, as shown in Fig. 3. In the assemblage of a chuck of this type, the flange 15 is provided with suitably shaped wires 16 extending across the substantially circular space inclosed by said flange, in the manner indicated in Fig. 4, so that when all these wires 16 are in place, there are provided a plurality of hexagonal spaces for all the pole pieces which enter into the construction of the face plate.

The method of construction of a chuck of this type is substantially the same as the method employed with the chuck of Fig. 1; the pouring and casting of the non-magnetic material 17 is carried out readily without any possibility of displacement of any of the pole pieces which are held by the wires 16. The coils 18 are then slipped over the cores 13 in such a manner as to energize adjacent pole pieces with opposite polarity, as shown by the + and − indications on Fig. 3. The assemblage of the chuck is completed by securing a base plate 19 thereon to close the shell 14, said base plate having screws 20 therein, each of which engages one of the cores 13 to hold the same rigidly in place. The base plate 19 may carry the usual screwthreaded collar 21 for procuring rotation of the chuck, and may also carry the insulated collector rings 22, whereby current is supplied to the coils 18.

Figure 5:
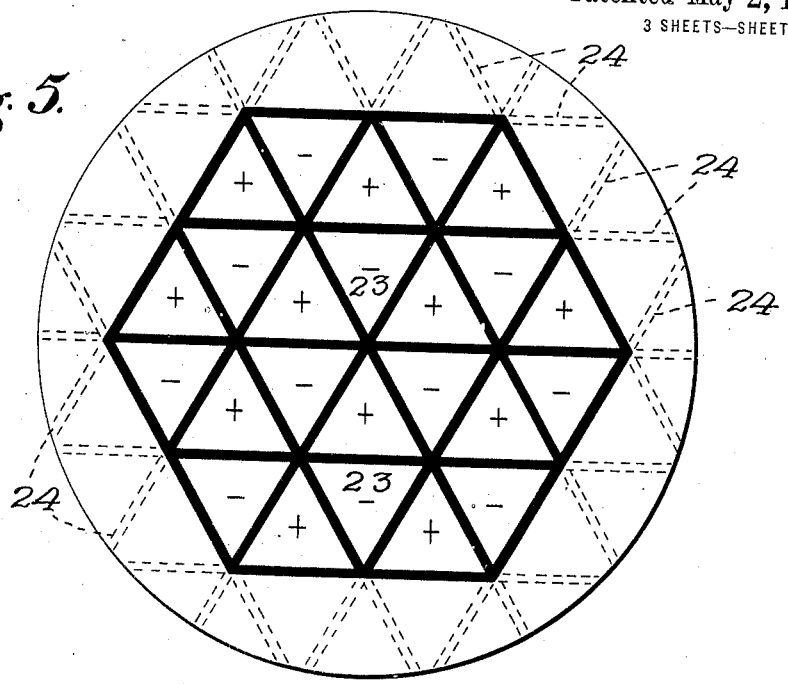
Fig. 5 is a plan view of a chuck embodying my invention, and providing pole pieces of a different shape from those shown in Figs. 1 and 3.

In Fig. 5 is shown a chuck having all the characteristics of the chucks of Figs. 1 and 3, and with a work holding face constituted by pole pieces 23 of triangular cross section, with integral shanks or cores, not shown, of the same construction as the cores 5 and 13. It will readily be seen that the pole elements of such a chuck are just as susceptible of manufacture as the pole elements of the chucks shown in Figs. 1 and 3, it being clear that an automatic bolt or screw machine of the usual type may be employed for the production of such pole elements from rolled stock of triangular cross section.

In such a chuck as shown in Fig. 5, the spacing wires 24 pass in straight lines across the interior of the shell, so that there is no necessity for specially shaping these wires, as was the case with the wires 16 of the chuck shown in Fig. 3. In all other respects the chuck shown in Fig. 5 is the same in construction as the chuck shown in Fig. 3, it being obvious that the coils thereof may be so disposed as to give opposite polarity to adjacent triangular pole pieces, as shown by the + and − indications on said figure.

Figure 6:
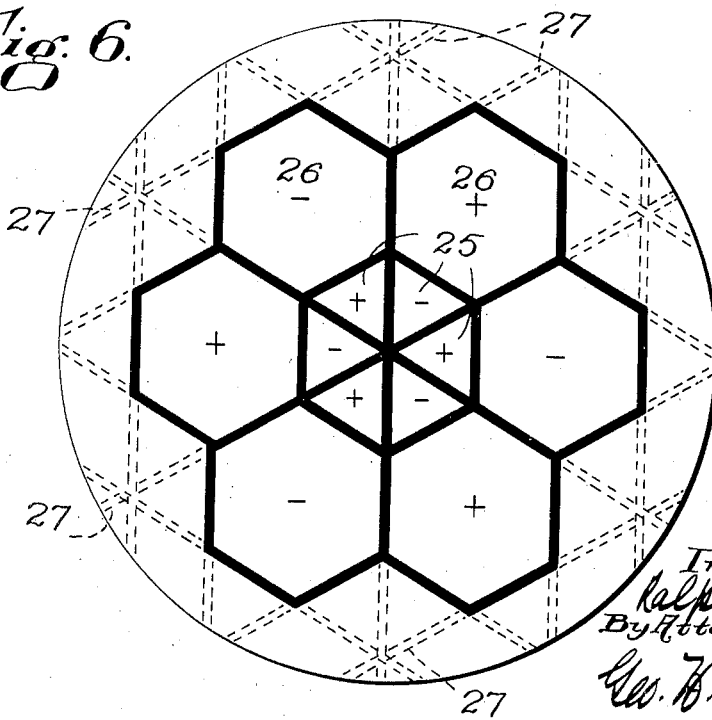
Fig. 6 is a plan view of a chuck embodying my invention, and employing a combination of the different shapes of pole pieces which are used in the chucks illustrated in Figs. 3 and 5.

In Fig. 6 is shown a circular chuck wherein is employed an inner series of triangular pole pieces 25 and an outer series of hexagonal pole pieces 26. The pole pieces 25 with their integral cores are constructed in precisely the same manner as the pole pieces 23 of Fig. 5, and the pole pieces 26 with their integral cores are constructed in precisely the same manner as the hexagonal pole pieces 12 of Fig. 3. The combination of these two types of pole pieces arranged in the manner shown in Fig. 6 gives a chuck face which is peculiarly suited for the retention of work at the center thereof, and an additional advantage is secured by the use of straight spacing wires 27, which become integral parts of the insulation between the pole pieces, the same as the wires 7 and 8 of Figs. 1 and 2, the wires 16 of Figs. 3 and 4 and the wires 24 of Fig. 5.

As shown most clearly in Figs. 1 and 3, the spacing wires where they cross each other are slightly spaced apart, thus allowing for the flow of the non-magnetic material to fill completely all the gaps or voids between the pole pieces; said material, in molted form, may be forced into these voids under pressure and because of the spaces left and the crossing points of the wires, the pouring can be done entirely from one side only of the chuck face.

Instead of using wires for holding the pole pieces in proper position during the operation of filling the voids of the chuck face with non-magnetic material, a somewhat different but substantially equivalent method of reaching the same result may be availed of; this is illustrated in Fig. 7 in connection with a rectangular chuck of the same type which is shown in Fig. 1. In the manufacture of this chuck a plate 28, of brass or other non-metallic material is closely fitted within the shell or body of the chuck, just below the rectangular top opening which is to be filled with the pole pieces constituting the work holding face. This plate 28 has a plurality of holes 29 therein, of suitable size and shape to receive the integral cores 30 of the pole pieces 31, said holes being so disposed as to fix the proper position of each pole piece, and retain it in this position while the voids between the pole pieces are being filled. The pouring in this instance is done from the upper side of the chuck face, and the plate 28 prevents the molten non-magnetic material from escaping.

I claim,

1. The herein described method of making a magnetic chuck face which consists in employing an open-work of non-magnetic material, inserting pole pieces in the spaces provided in said open-work, and filling the spaces remaining between said pole pieces with molten non-magnetic material.

2. The herein described method of making a magnetic chuck which consists in providing a frame having a top opening for the chuck face, disposing an open-work of non-magnetic material in said opening, inserting pole pieces in the spaces provided in said open-work and in solidifying the chuck face by filling the voids between the pole pieces with molten non-magnetic material.

3. A magnetic chuck, comprising a framework providing a top opening, a plurality of pole pieces arranged in said opening, and an open-work of non-magnetic material carried by said framework for spacing the edges of said pole pieces from each other and from the edges of said opening, the spaces thus provided between said pole pieces being filled with a solid non-magnetic material.

4. A magnetic chuck, comprising a framework providing a top opening, a plurality of pole pieces arranged in said opening, and means carried by said framework and extending across said opening for spacing the edges of said pole pieces from each other and from the edges of said opening, the spaces thus provided between said pole pieces being filled with a solid non-magnetic material.

5. A magnetic chuck, comprising a framework providing a top opening, a plurality of pole pieces arranged in said opening, and a plurality of wires of non-magnetic material supported in said opening, and extending between the pole pieces to retain said pole pieces in spaced relation to each other and to the edges of said opening, the spaces thus provided between said pole pieces being filled with a solid non-magnetic material.

6. A magnetic chuck, comprising a framework providing a top opening, a plurality of pole pieces arranged in said opening, and a plurality of wires of non-magnetic material supported in said opening, and extending between the pole pieces to maintain said pole pieces in spaced relation to each other and to the edges of said opening, said wires being spaced apart at the points where they cross each other and being embedded in solid non-magnetic material.

7. The herein described method of making a magnetic chuck, which consists in providing a latticework of non-magnetic wires to form spaces corresponding to the size and shape of the pole pieces, inserting said pole pieces in the spaces defined by said wires, and pouring molten non-magnetic material to fill the voids between said pole pieces.

8. The herein described method of making a magnetic chuck, which consists in employing a series of wires of non-magnetic material to define the spaces in the chuck face to be occupied by the pole pieces, inserting the pole pieces in said spaces, and surrounding said wires with non-magnetic material in the voids between said pole pieces.

9. The herein described method of making a magnetic chuck, which consists in defining the location of the pole pieces by a series of wires of non-magnetic material arranged in the opening of the chuck face to be occupied by said pole pieces, disposing the pole pieces in the spaces between said wires, and solidifying the chuck face by filling the voids between the pole pieces, containing said wires, with non-magnetic material.

RALPH L. MORGAN.

Witnesses:
PENELOPE COMBERBACK,
GEO. H. KENNEDY, Jr.